(12) United States Patent
Choe

(10) Patent No.: US 6,479,959 B2
(45) Date of Patent: Nov. 12, 2002

(54) SELF-EXCITED RELUCTANCE MOTOR

(75) Inventor: You-young Choe, Suwon (KR)

(73) Assignee: Samsung Kwangju Electronics Co., Ltd., Kwangju (KR)

( * ) Notice: Subject to any disclaimer, the term of this patent is extended or adjusted under 35 U.S.C. 154(b) by 152 days.

(21) Appl. No.: 09/733,589

(22) Filed: Dec. 7, 2000

(65) Prior Publication Data

US 2001/0005105 A1 Jun. 28, 2001

(30) Foreign Application Priority Data

Dec. 8, 1999 (KR) .......................................... 99-55947
Mar. 30, 2000 (KR) .......................................... 00-16436

(51) Int. Cl.$^7$ ................................................ H02P 7/05
(52) U.S. Cl. ...................... 318/439; 318/254; 318/701
(58) Field of Search .................................. 318/138, 254, 318/439, 701, 437; 310/68 R, 248, 249; 388/928

(56) References Cited

U.S. PATENT DOCUMENTS

| | | | | |
|---|---|---|---|---|
| 2,155,557 A | * | 4/1939 | Kranz | |
| 2,442,626 A | * | 6/1948 | Tolson et al. | |
| 2,704,334 A | * | 3/1955 | Brailsford | 310/68 R |
| 2,808,556 A | * | 10/1957 | Thomas | 318/254 |
| 3,042,847 A | * | 7/1962 | Welch | 318/254 |
| 3,242,405 A | * | 3/1966 | Ikegami | 318/138 |
| 3,806,785 A | * | 4/1974 | De Valroger et al. | 318/254 |
| 5,522,653 A | * | 6/1996 | Fulks et al. | 318/254 X |

* cited by examiner

Primary Examiner—Bentsu Ro
(74) Attorney, Agent, or Firm—Ladas & Parry

(57) ABSTRACT

A self-excited reluctance motor capable of driving a motor with a commutator and without having to use a commutator logic for power electric circuit. The self-excited reluctance motor includes a stator having a plurality of stator poles respectively wound by wires of different phases; a rotator having a plurality of rotator poles formed on an outer circumference thereof, the rotator rotatably inserted in the stator; and a commutator. The commutator includes a body coaxially arranged with the rotator, and formed of an insulating material; an electrode formed on an outer circumference of the commutator body; a plurality of switching portions formed on the outer circumference of the commutator body at a predetermined distance from each other, and electrically connected with the electrode; a plurality of switching brushes connected to stator wires of different phases and to the plurality of switching portions, for permitting an electric current to flow the respective stator wires; and an electrode brush electrically connected to an external power source and to the electrode.

9 Claims, 7 Drawing Sheets

US 6,479,959 B2

SELF-EXCITED RELUCTANCE MOTOR

BACKGROUND OF THE INVENTION

1. Field of the Invention

The present invention relates to a Switched Reluctance Motor (SRM), and more particularly to a self-excited reluctance motor capable of generating a rotating force with a simple commutator made based on a classical commutation theory, without using a commutation logic of an electric circuit, or making any changes to characteristics of a conventional SRM.

2. Description of the Related Art

Generally, a Switched Reluctance Motor (SRM) rotates at a relatively higher speed with a simpler structure, when compared to an induction motor. Also, by using a semiconductor element as a switch for controlling electric power, the SRM not only has an accurate control on various functions are possible, but also has a higher efficiency. For such advantages of the SRM, there have been many researches and developments of SRM.

As shown in FIG. 1, the SRM simply includes a stator 1 and a rotator 3 without a commutator. The SRM has a dual-pole structure which has stator poles 2 and rotator poles 4. The rotator 3 is formed of silicon steel plates which are stacked on each other firmly. In the stator 1, two opposing stator poles 2 are connected by a wire in parallel or series in order to generate a magnetic flux toward the same direction.

The SRM mainly includes a 6/4 pole SRM having six stator poles and four rotator poles, a 12/8 pole SRM having twelve stator poles and eight rotator poles, and 24/16 pole SRM having twenty-four stator poles and sixteen rotator poles.

Among these, a driving principle and method of the SRM will be described, with reference to an example of 3-phase 12/8 pole SRM.

First, the driving principle of the SRM will be described with reference to FIGS. 1 and 2. FIG. 1 is a sectional view of a conventional 3-phase 12/8 pole SRM. Although FIG. 1 shows only certain stator poles 2 being wound by coils for a more convenient explanation thereof, it will be fully understood by those skilled in art that the other stator poles 2 are also wound by phase-A, phase-B, and phase-C coils in the same manner.

When electric voltage is applied to a wire (a–a') winding the stator poles 2a and 2a', the stator poles 2a and 2a' are excited, and the neighboring rotator poles 4 are rotated in the direction of arrow of FIG. 1, to be aligned with the stator poles 2a and 2a' which are excited. Before the alignment of the excited stator poles 2a and 2a' and the neighboring rotator poles 4, the electric voltage supply to the wire (a–a') is cut off. Next, electric voltage is supplied to the neighboring stator wire (b–b'), and the stator poles 2b and 2b' are excited. Accordingly, in the same manner as described above, the neighboring rotator poles 4 of the newly excited stator poles 2b and 2b' are rotated in the direction of arrow of FIG. 1 to be aligned with the newly excited stator poles 2b and 2b'. As the stator poles 2a and 2a', 2b and 2b', and 2c and 2c' are sequentially excited in the above-described manner, the rotator 3 is continuously rotated.

FIGS. 2(a) to 2(b) are sectional views for showing the positions of the rotator poles 4 with respect to excited stator poles 2 of the 12/8 pole SRM. As shown in FIG. 2(a), when the rotator poles 4b are aligned with the excited stator poles 2a and 2a' in a straight line (hereinafter called alignment position), a torque is not generated even when electric current flows in the stator wire (a–a'). Meanwhile, as shown in FIGS. 2(c) and 2(d), when the rotator poles 4b are out of alignment position with the stator poles 2a and 2a', the rotator 3 generates a torque to go to the alignment position.

As shown in FIG. 2(b), when middle points of the neighboring poles 4a and 4b, and 4c and 4d of the rotator 3 are aligned with the excited stator poles 2a and 2a' in straight lines (Q: non-alignment position), as in the alignment state, a torque is not generated even when electric current flows in the stator wire (a–a'). If the rotator poles 4 are out of the alignment position even by a slight degree, the excited stator poles 2 attract the nearest rotator poles 4 to a new alignment position, generating a torque.

As shown in FIGS. 2(c) and 2(d), when the rotator poles 4 are not in the alignment or non-alignment position, and when electric current flows in the stator wire (a–a', b–b', or c–c') of the stator poles 2a and 2a', 2b and 2b', or 2c and 2c', a torque is generated to align the rotator 3 to the alignment position as in FIG. 2(a).

Next, a driving circuit for driving the 3-phase 12/8 pole SRM will be described. In order to drive the SRM, a driving converter is required. Generally, the driving converter has to i) supply a voltage to a wire of a stator pole 2 which corresponds to a rotator pole 4, ii) control or maintain the electric current at a suitable level for exciting the stator pole 2, and iii) supply a backward voltage for electric current extinction at an excited phase. The requirement iii) is mainly conducted by a diode.

Currently, many converter topologies have been studied to control the SRM, in a manner of reducing converter manufacturing cost by reducing a number of switching elements, and also improving a controlling performance.

As a driving converter, there mainly are Asymmetric Bridge Converter, BifillarWinding Converter, Split-Source Converter, Capacitor-Dump converter, Resistor-Dump Converter, and Switch-Shared Converter available at the present time. Among these converters, the driving method of the driving converter will now be described briefly with a reference to an example of the Asymmetric Bridge Converter.

FIG. 3 is a circuit diagram for showing a conventional Asymmetric Bridge Converter, especially for showing an electric circuit for driving the 3-phase 12/8 pole SRM. As shown in FIG. 3, the Asymmetric Bridge Converter includes plural pairs of switches (transistor elements T1 and T2, T3 and T4, and T5 and T6) and diodes (D1 and D2, D3 and D4, and D5 and D6).

In the electric circuit, by turning on and thus supplying Direction Current voltage to the pair of switches T1 and T2, or T3 and T4, or T5 and T6 connected to phase-A, phase-B, or phase-C, the corresponding stator poles 2 are excited. While electric current flows in the stator wire, the level of electric current is controlled by selectively turning on or off one or both of the pair of switches T1 or/and T2, or T3 or/and T4, or T5 or/and T6. Accordingly, electric current circulates through one diode D1 or D2 and one switch T1 or T2, or circulates through both of the diodes D1 and D2, charging a condenser. Next, when the pair of switches T1 and T2 are turned off, electric current is dissipated. Here, before an inductance of corresponding phase draws a negative slope, the electric current should be reduced to an dissipation or to a negligible degree.

Since the conventional converter is formed of a plurality of electric elements, the structure thereof is complex, and the manufacturing cost increases. Accordingly, it is almost impossible to employ the converter in a low-price devices. Further, in order to control the switches T1 and T2, T3 and T4, and T5 and T6, a separate controlling means such as a microcomputer is required. Since a control algorithm also should be developed, it is hard to employ the converter to control the SRM.

SUMMARY OF THE INVENTION

The present invention has been made to overcome the above-mentioned problems of the related art, and accordingly, it is an object of the present invention to provide a selfexcited reluctance motor capable of generating a rotating force with a simple commutator and without having to use a high-price electric circuit.

The above object is accomplished by a self-excited reluctance motor according to the present invention, including a stator having a plurality of stator poles respectively wound by wires of different phases; a rotator having a plurality of rotator poles formed on an outer circumference thereof, the rotator rotatably inserted in the stator; and a commutator. The commutator includes a body coaxially arranged with the rotator, and formed of an insulating material; an electrode formed on an outer circumference of the commutator body; a plurality of switching portions formed on the outer circumference of the commutator body at a predetermined distance from each other, and connected with the electrode; a plurality of switching brushes electrically connected to stator wires of different phases and to the plurality of switching portions, for permitting an electric current to flow the respective stator wires; and an electrode brush electrically connected to an external power source and to the electrode.

Accordingly to the present invention, the switching portions are spaced from each other at an angle that the stator is rotated from a point where a certain stator pole and rotator pole are aligned with each other to a point where the next stator pole and rotator pole are aligned with each other. The switching portions are symmetrically formed in pairs on an outer circumference of the commutator body.

Further, the electrode includes a positive electrode and a negative electrode. The positive electrode is electrically connected to one of the switching portions and through an interior of the commutator body, while the negative electrode is electrically connected to the other one of the switching portion and through the interior of the commutator.

According to another aspect of the present invention, a number of the switching portions formed on the outer circumference of the commutator body corresponds to a number of places where the stator poles and the rotator poles are aligned with each other.

The switching brushes are spaced from each other at an angle that the stator is rotated from a point where a certain stator pole and rotator pole are aligned with each other to a point where the next stator pole and rotator pole are aligned with each other. The switching portions are formed on the outer circumference of the commutator body, and are spaced from each other at an angle of 90°.

According to the present invention, during the rotation of the commutator body and the rotator, the switching portions and switching brushes repeat electricity supply and cut-off with respect to the stator wires of the respective phases. Accordingly, a torque is generated at the rotator, and the rotator is continuously rotated.

Accordingly, without any switching operation of the circuit elements with respect to the respective phases, the rotator is continuously rotated by a mechanism of the commutator connected to the rotator, and thus, the motor is also continuously rotated.

BRIEF DESCRIPTION OF THE DRAWINGS

The above and other objects and the advantages of the present invention will become readily apparent by reference to the following detailed description when considered in conjunction with the accompanying drawings in which.

DETAILED DESCRIPTION OF THE PREFERRED EMBODIMENT

Embodiments 1 and 2 respectively describe the cases where different types of commutator are applied to drive a motor.

EMBODIMENT 1

Figure 1:
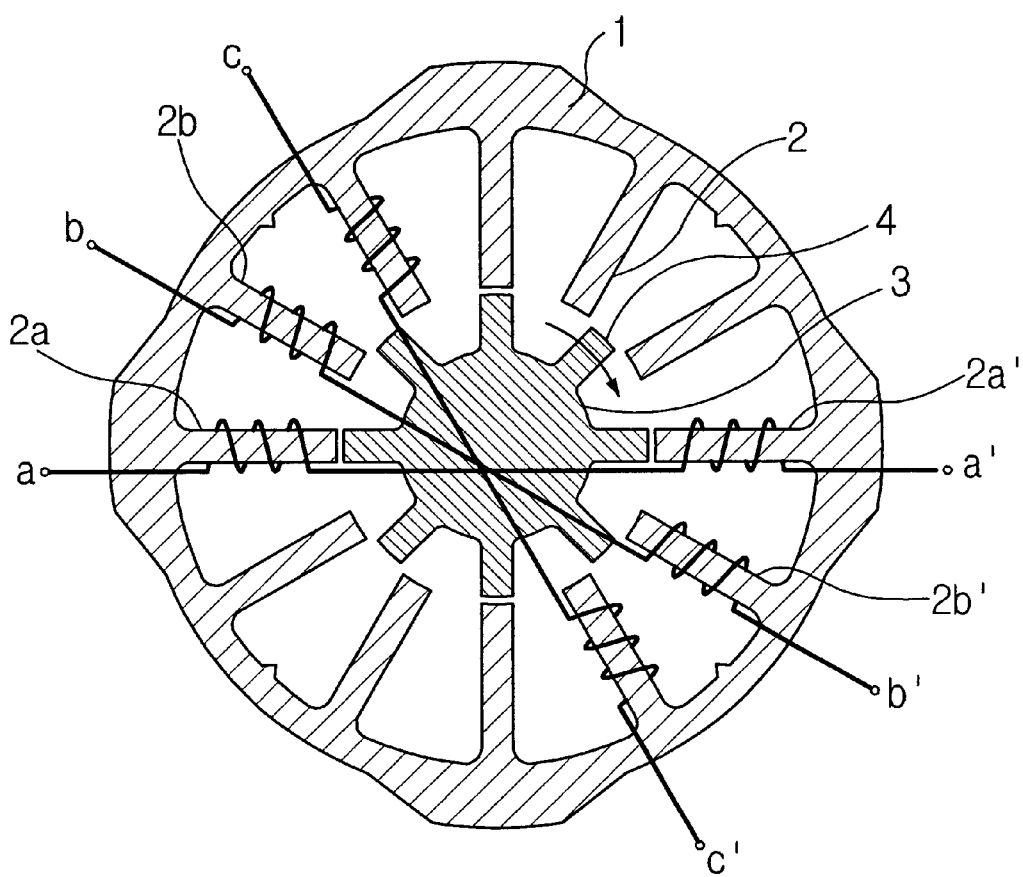
FIG. 1 is a sectional view of a conventional 3-phase 12/8 pole SRM.
Figure 2:
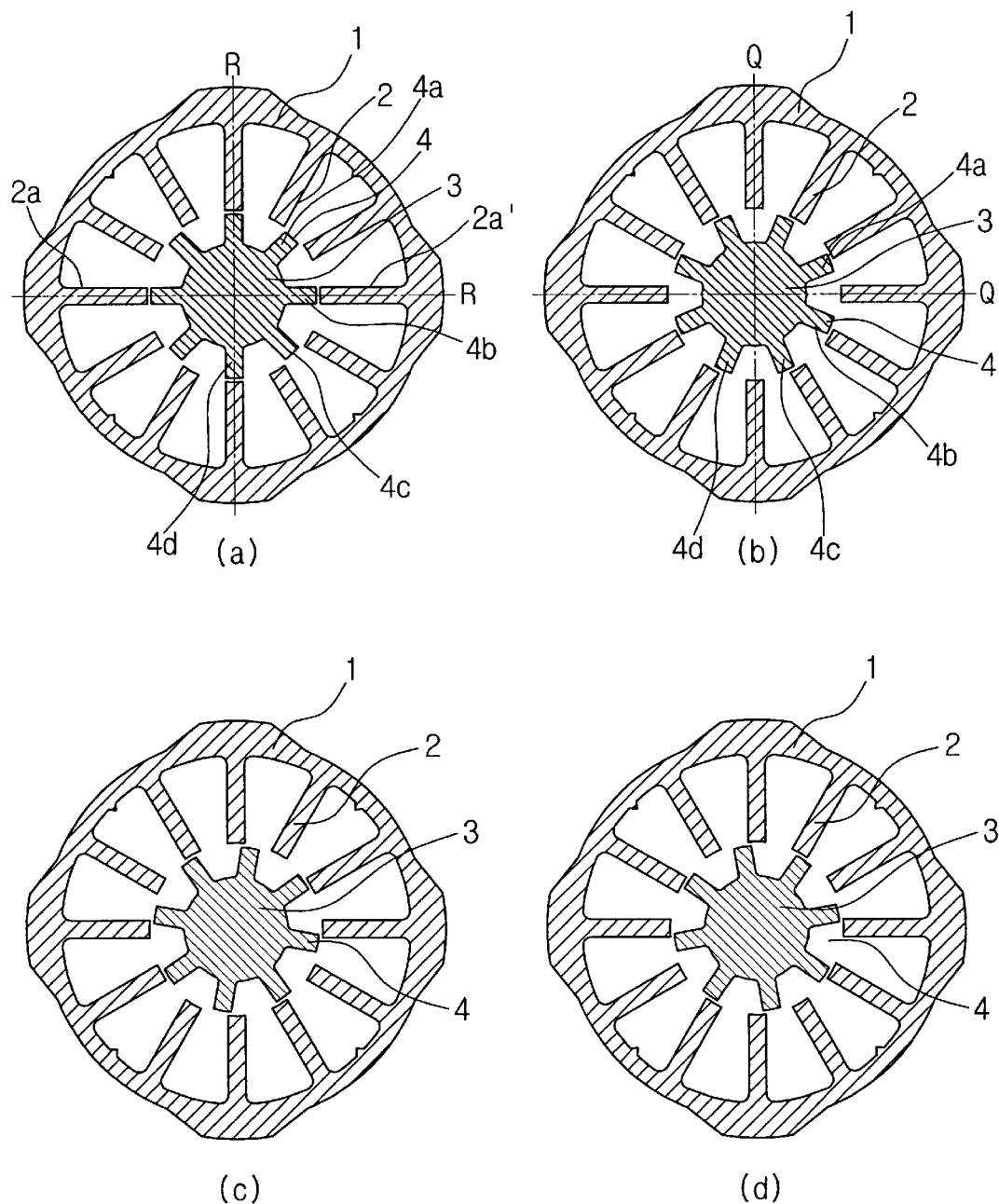
FIGS. 2(a) to 2(d) are sectional views for showing the position of rotator poles with respect to excited stator poles of the 3-phase 12/8 pole SRM.
Figure 3:
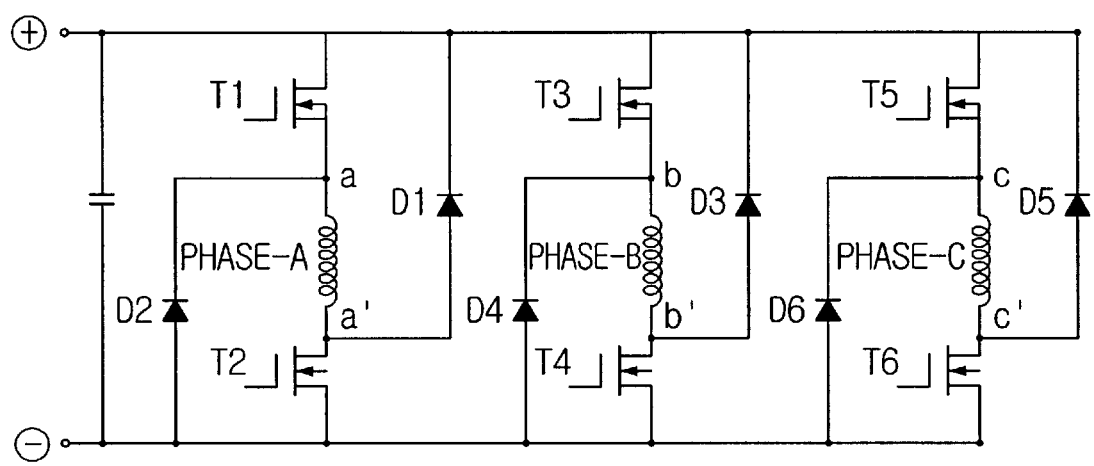
FIG. 3 is a circuit diagram of a conventional Asymmetric Bridge Converter, for showing an electric circuit for driving the 3-phase 12/8 pole SRM.
Figure 4:
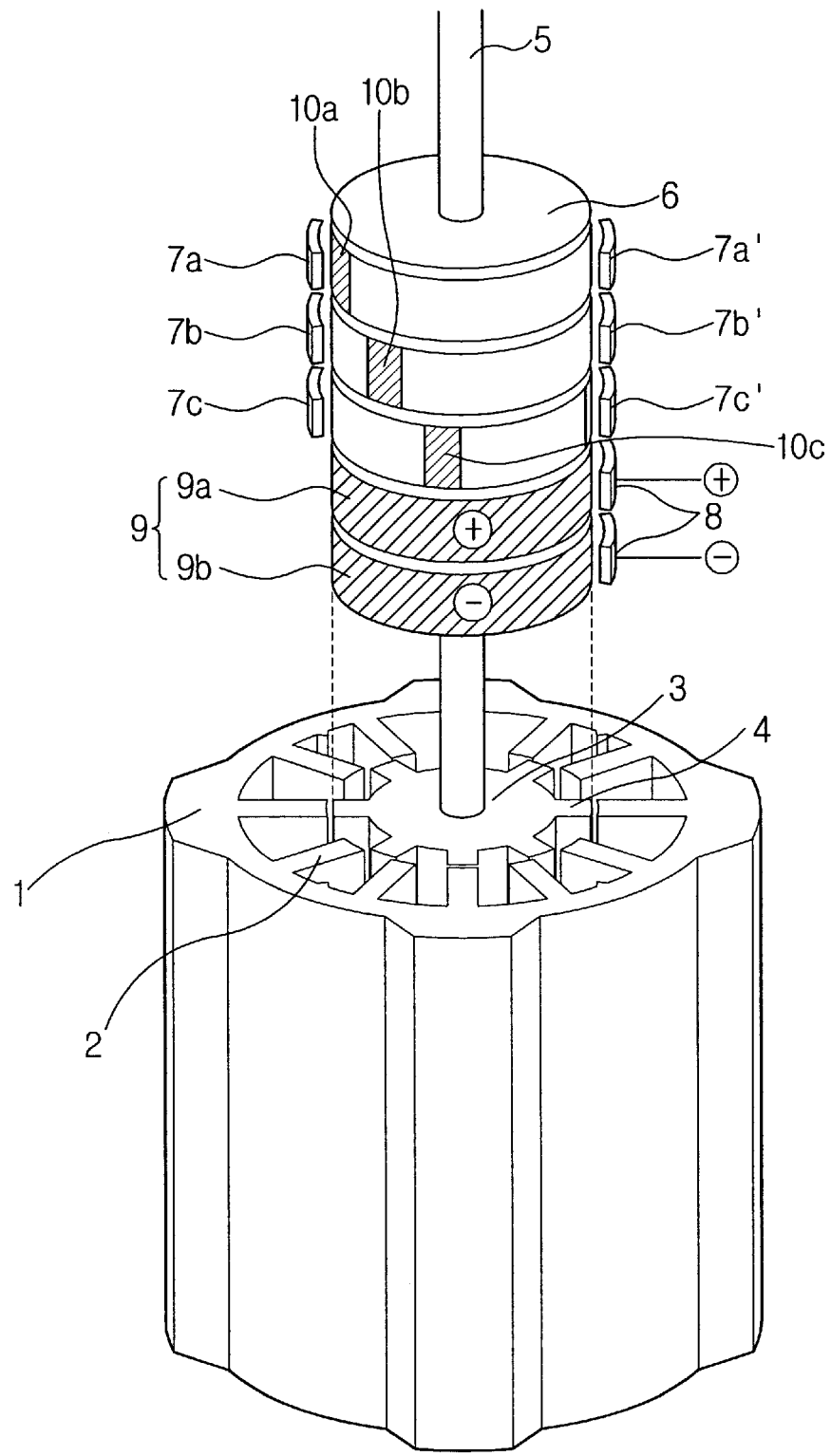
FIG. 4 is a perspective view for schematically showing a self-excited reluctance motor in which a commutator is disposed on a shaft of the rotators according to the preferred embodiment of the present invention.
Figure 5:
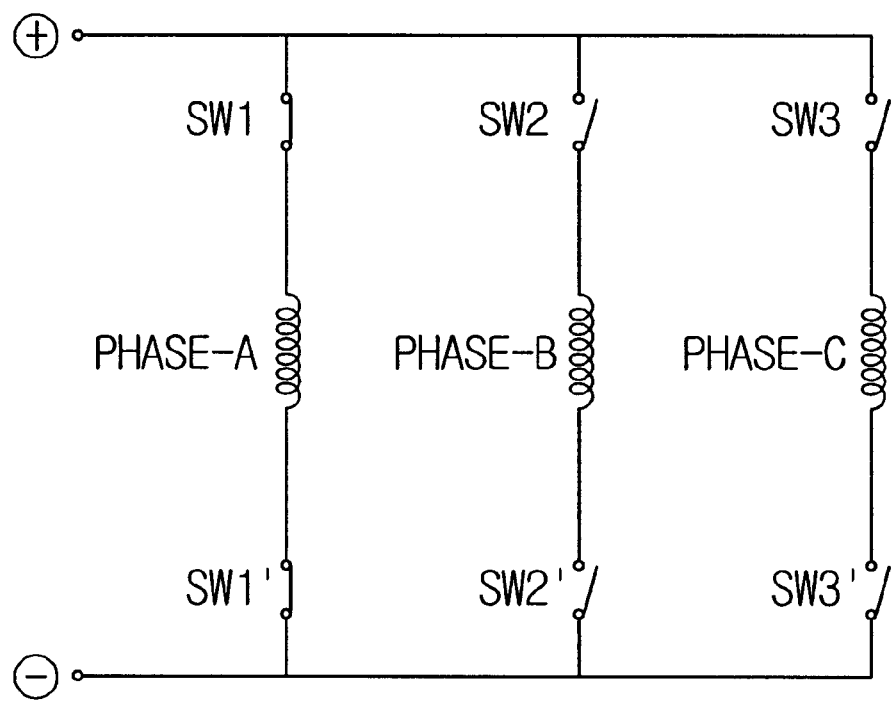
FIG. 5 is an equivalent circuit diagram of the self-excited reluctance motor of FIG. 4.

FIG. 4 is a perspective view for schematically showing a self-excited reluctance motor in which a commutator is disposed on a shaft of the rotator according to the preferred embodiment of the present invention, and FIG. 5 is an equivalent circuit diagram of the SRM of FIG. 4. In this embodiment, a 3-phase 12/8 pole SRM is employed. In FIG. 4, a reference numeral 1 is a stator, 2 is a stator pole, 3 is a rotator, 4 is a rotator pole, and 5 is a rotator shaft. Except for a type of commutator being employed, the structure of the self-excited reluctance motor is identical with the structure of the SRM described earlier with reference to FIG. 1. Accordingly, only a commutator will be described in greater detail.

In FIG. 4, a reference numeral 6 is a commutator body, and reference numerals 10a, 10b, and 10c are phase-A, phase-B, and phase-C switching portions for supplying or cutting off electricity to respective stator wires of phase-A, phase-B, and phase-C. Reference numerals 7a, 7b, and 7c are first phase-A, phase-B, and phase-C switching brushes connected to terminals of phase-A, phase-B, and phase-C stator wires, and 7a', 7b', and 7c' are second phase-A, phase-B, and phase-C switching brushes connected to terminals of other phase-A, phase-B, and phase-C stator wires. Albeit not shown, the phase-A, phase-B, and phase-C switching portions 10a, 10b, and 10c are formed in pairs, opposing to each other on the outer circumference of the commutator body 6.

As shown in FIG. 4, the commutator according to the present invention is disposed on a shaft 5 of the rotator 3. A pair of conductors (not shown) are formed in the commutator body 6, while a cylindric insulating material is formed on the outer surface of the commutator body 6. The pair of conductors are insulated from each other by the insulating material. A diameter of the commutator body 6 is identical to the diameter of the rotor 3. The commutator body 6 is integrally fixed on the shaft 5 of the rotor 3 to be rotated together with the rotor 3.

The outer circumference of the commutator body 6 is divided into a plurality of bands where pairs of phase-A, phase-B, and phase-C switching portions 10a, 10b, and 10c, and electrodes 9a and 9b of conductive material are partially formed. Preferably, the conductive material can either formed by molding, or any proper method such as coating.

The electrodes 9a and 9b include a positive electrode 9a and negative electrode 9b which are formed as a conductive material is applied to the whole outer circumference of a lower end of the commutator body 6. Since the pair of positive and negative electrodes 9a and 9b are vertically spaced from each other at a predetermined distance due to the presence of an insulating band formed therebewteen, the positive and negative electrodes 9a and 9b do not contact with each other, but contact with the electrode brushes 8 which are connected to an external power source.

Above the electrodes 9a and 9b, and on the outer circumference of the commutator body 6, a switching portion of conductive material are formed, corresponding to the number of phases of the motor. Accordingly, in the 3-phase motor, three conductive phase-A, phase-B, and phase-C switching portions 10a, 10b, and 10c are partially formed on the three straps of insulating material on the outer circumference of the commutator body 6. The switching portions 10a, 10b, and 10c of conductive material are spaced from each other at a predetermined distance due to the presence of insulating material.

Further, by arranging the phase-A, phase-B, and phase-C switching portions 10a, 10b, and 10c on the outer circumference of the commutator body 6 at a predetermined distance from each other in a circumferential direction, the respective phases are spaced from each other at a predetermined interval. One of the phase-A, phase-B, and phase-C switching portions 10a, 10b, and 10c and the positive electrode 9a are integrally formed with the conductor within the commutator body 6, while the other one of the phase-A, phase-B, and phase-C switching portions 10a, 10b, and 10c and the negative electrode 9b are integrally formed with the other conductor within the commutator body 6.

In the 3-phase 12/8 pole SRM where the rotor 3 rotates from the non-alignment state to the alignment state by an angle of 15°, it is preferable that phase-A, phase-B, and phase-C switching portions 10a, 10b, and 10c are spaced from each other by the insulating material at an angle of 15°.

Although FIG. 4 shows only ones of the pairs of phase-A, phase-B, and phase-C switching portions 10a, 10b, and 10c formed on the outer circumference of the commutator body 6, the other ones of the pairs of phase-A, phase-B, and phase-C switching portions 10a, 10b, and 10c are also correspondingly formed on the opposite side of the outer circumference of the commutator body 6.

Further, one of the phase-A switching portions 10a and the first phase-A switching brush 7a form a first phase-A switch SW1, while the other one of the phase-A switching portions 10a and the second phase-A switching brush 7a' form a second phase-A switch SW1'. Also, the pair of phase-B switching portions 10b and the pair of phase-B switching brushes 7b and 7b' form first and second phase-B switches SW2 and SW2', while the pairs of the phase-C switching portions 10c and the pair of phase-C switching brushes 7c and 7c' form first and second phase-C switches SW3 and SW3'.

In the commutator constructed as above, electricity is applied by the contact of the electrode brushes 8 and the electrodes 9a and 9b. By the contact of the pair of phase-A switching portions 10a of the commutator body 6 and the first and second and phase-A switching brushes 7a and 7a', the first and second phase-A switches SW1 and SW1' are switched on (see FIG. 5), permitting electric current to flow only through the phase-A stator wire. Accordingly, the phase-A stator poles 2 are excited, and the neighboring rotor poles 4 are rotated to be aligned with the excited stator poles 2 (i.e., to be in alignment position).

The commutator body 6 is rotated together with the rotor 3, passing the alignment position. As a result, the contact of the pair of the phase-A switching portions 10a with the first and second phase-A switching brushes 7a and 7a' is cut off. The first and second phase-A switches SW1 and SW1' are switched off, while the pair of phase-B switching portions 10b contact with the first and second phase-B switching brushes 7b and 7b'. Accordingly, the first and second phase-B switches SW2 and SW2' are switched on, permitting electric current only through the phase-B stator wire. The phase-B stator poles 2 are excited, and the neighboring rotor poles 4 are rotated to be aligned with the excited stator poles 2. In this manner, the rotor 3 and the commutator body 6 are continuously rotated.

As described above, by the sequential contact of the phase-A, phase-B, and phase-C switching portions 10a, 10b, and 10c with the phase-A, phase-B, and phase-C switching brushes 7a and 7a', 7b and 7b', and 7c and 7c', the rotor 3 and the commutator body 6 are continuously rotated.

EMBODIMENT 2

Figure 6:
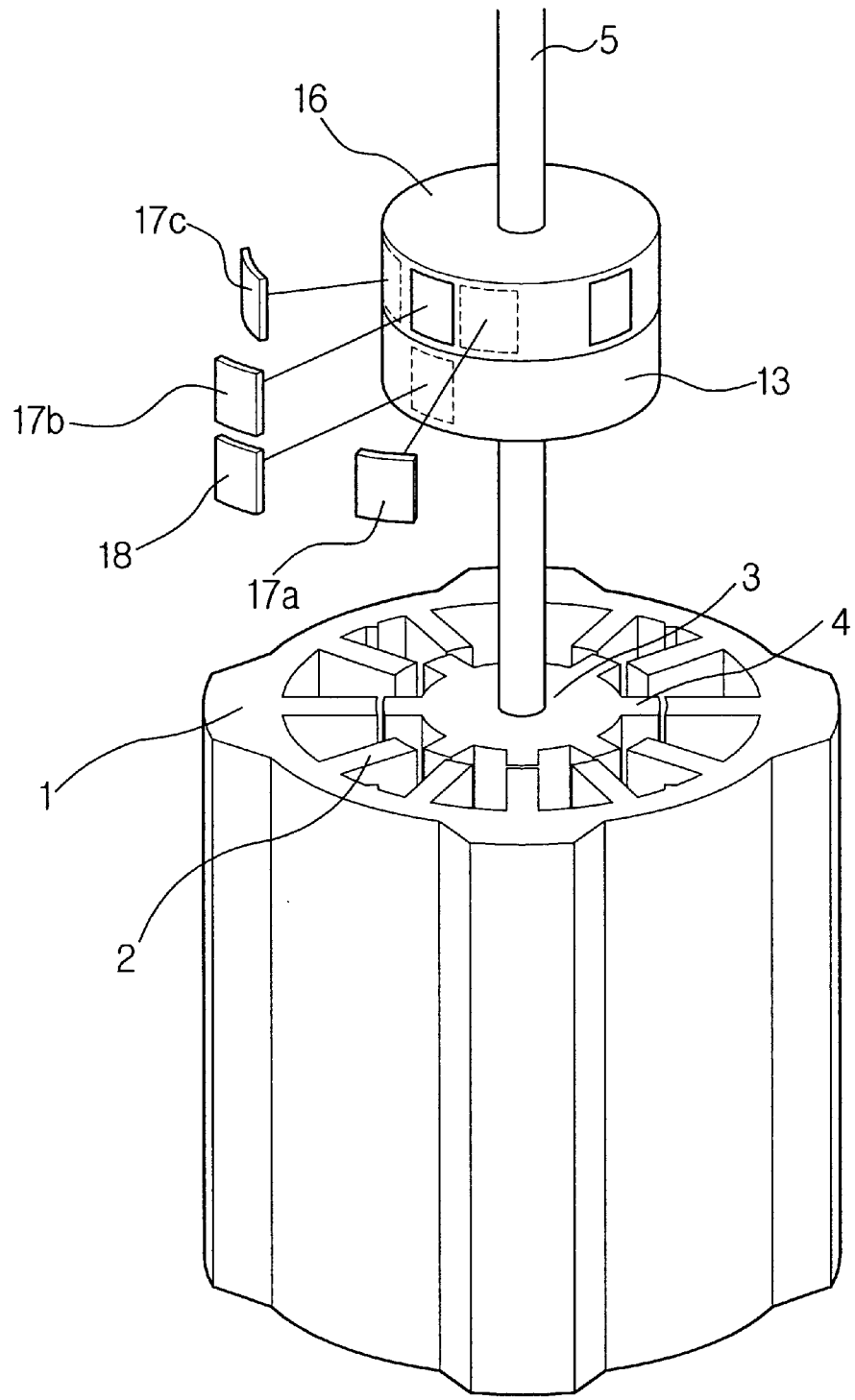
FIG. 6 is a perspective view for schematically showing the self-excited reluctance motor in which a commutator is disposed on a shaft of the rotator according to another preferred embodiment of the present invention.
Figure 7:
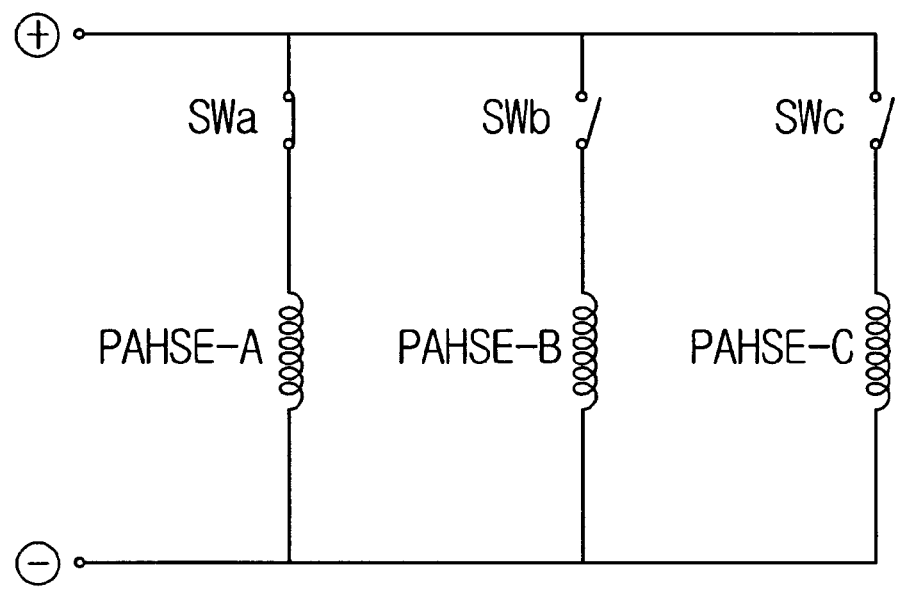
FIG. 7 is an equivalent circuit diagram of the self-excited reluctance motor of FIG. 6.

FIG. 6 is a perspective view for schematically showing the self-excited reluctance motor in which a commutator is disposed on a shaft of the rotor according to another preferred embodiment of the present invention, and FIG. 7 is an equivalent circuit diagram of the self-excited reluctance motor of FIG. 6. Throughout the description of this embodiment, the like elements will be given the same reference numerals, while the description of the identical elements will be omitted.

In FIG. 6, a reference numeral 16 is a commutator body, and reference numerals 17a, 17b, and 17c are switching brushes which are connected to phase-A, phase-B, and phase-C stator wires. Reference numeral 18 is an electrode brush.

As shown in FIG. 6, the commutator according to the present invention is disposed on the shaft 5 of the rotor 3. A commutator body 16 is made of a cylindric insulating material. A diameter of the commutator body 16 is identical with a diameter of the rotor 3. The commutator body 16 is rotated together with the rotor 3.

An outer circumference of the commutator body 16 is divided into a plurality of bands, for example, two bands. An electrode conductive section 13 is annularly formed along an outer circumference of the lower band, while a plurality of switching portions 12 are formed on an outer circumference of an upper band, electrically corresponding to the electrode conductive portions 13. In the 3-phase 12/8 pole SRM, there are four (4) points where the stator poles 2 and the rotor poles 4 are aligned with each other. Accordingly, it is preferable that four (4) switching portions 12 are formed on the outer circumference of the commutator body 6 at an angle of 90°. Here, it is also preferable that the width of each switching portion 12 should be less or equal to 15°.

The electrode conductive portions 13 and switching portions 12 are formed of a conductive material such as a copper, by a molding or any proper method such as coating.

The electrode conductive portions 13 contact with the electrode brushes 18 which are connected with a positive terminal of an external power supply. The electrode conductive portions 13 are also electrically connected to the switching portions 12 through the conductor formed within the commutator body 16. Preferably, the electrode conductive portions 13 are integrally formed with the switching portions 12.

The switching portions 12 contact with the switching brushes 17a, 17b, and 17c. In the 3-phase 12/8 pole SRM, the width of each of the switching brushes 17a, 17b, and 17c is less than or equals to 15°. The respective switching brushes 17a, 17b, and 17c are installed at an angle of 30°, and are spaced from each other by 15°. For example, a middle point of the phase-A switching brush 17a, the rotator shaft 5, and phase-B switching brush 17 should be at an angle of 30A°, while one side of the phase-A switching brush 17a and the other side of the phase-B switching brush 17b should be spaced from each other at an angle of 15°. Since the switching portions 12 are formed on the commutator body 16 at every 90°, one side of the phase-A switching brush 17a and the other side of the phase-B switching brush 17b may be at an angle of 105°. The three switching brushes 17a, 17b, and 17c contact with one of the four switching portions 12 in a sequential manner during the rotation of the commutator body 16 turning on the phase-A, phase-B, and phase-C stator wires, sequentially.

The operation of the commutator of the SRM according to the present invention will be described below.

First, electricity is supplied through the electrode brushes 18. Then, the switching portions 12 contact with one of the switching brushes 17a, 17b, and 17c, for example, with the phase-A switching brush 17a. As shown in FIG. 7, the phase-A switch SWa is closed while the other phase switches SWb and SWc are opened. Then, electric current flows in the phase-a stator wire, exciting the corresponding stator poles 2. Accordingly, a torque is generated at the rotator 3, and the rotator 3 is rotated.

Together with the rotator 3, the commutator body 16 is also rotated, and accordingly, the phase-A switching brush 17a comes out of contact with the switching portions 12, while the phase-B switching brush 17b enters into a contact with the switching portions 12. Accordingly, the phase-A switch SWa is switched off, while the phase-B switch SWb is closed. As a result, electric current flows in the phase-B stator wire, exciting the corresponding stator pole 2. By the excited stator poles 2, a torque is generated at the rotator 3, continuously rotating the rotator 3 and the commutator body 16.

As the rotator 3 and the commutator body 16 are rotated until the phase-B switching brush 17b comes out of the contact with the switching portions 12, the phase-C switching brush 17c contacts with the switching portions 12. Accordingly, the phase-B switch SWb is switched off, while the phase-C switch SWc is switched on. Accordingly, electric current flows only in the phase-C stator wire, exciting the corresponding stator poles 2. Again, a torque is generated at the rotator 3 due to the excited stator poles 2, and the rotator 3 and the commutator body 16 are rotated.

As described above, in the self-excited reluctance motor according to the present invention, the rotator 3 sequentially contacts with the switching portions 12 of the switching brushes 17a, 17b, and 17c by the rotation of the commutator body 16. Accordingly, in the non-torque generation area, the switches SWa, SWb, and SWc are switched on, sequentially exciting the stator poles 2 of the respective phases. Accordingly, torque is continuously generated at the rotator 3, and the rotator 3 is continuously rotated.

Accordingly, without a switching operation of separate circuit element, the rotator 3 can be continuously rotated by the commutator, and the motor can be driven.

Although the above-described embodiments employ the 3-phase 12/8 pole SRM, the present invention also may be applied to the other types of SRM, such as 2-phase, 4-phase, 6/4 pole, 24/16 pole SRM, etc.

As stated above, preferred embodiments of the present invention are shown and described. Although the preferred embodiments of the present invention have been described, it is understood that the present invention should not be limited to the preferred embodiments but various changes and modifications can be made by one skilled in the art within the spirit and scope of the present invention as hereinafter claimed.

What is claimed is:

1. A self-excited reluctance motor comprising:

a stator having a plurality of stator poles respectively wound by wires of different phases;

a rotator having a plurality of rotator poles formed on an outer circumference thereof, the rotator rotatably inserted in the stator; and a commutator having
 a commutator body coaxially arranged with the rotator, and formed of an insulating material;
 an electrode formed on an outer circumference of the commutator body;
 a plurality of switching portions formed on the outer circumference of the commutator body at a predetermined distance from each other, and electrically connected with the electrode;
 a plurality of switching brushes electrically connected to stator wires of different phases and to the plurality of switching portions, for permitting an electric current to flow the respective stator wires; and
 an electrode brush connected to an external power source and to the electrode.

2. The self-excited reluctance motor as claimed in claim 1, wherein the switching portions are spaced from each other at an angle that the stator is rotated from a point where a certain stator pole and rotator pole are aligned with each other to a point where the next stator pole and rotator pole are aligned with each other.

3. The self-excited reluctance motor as claimed in claim 1, wherein the switching portions are symmetrically formed in pairs on the outer circumference of the commutator body.

4. The self-excited reluctance motor as claimed in claim 3, wherein the electrode comprises a positive electrode and a negative electrode, the positive electrode being electrically connected to one of the switching portions and through an interior of the commutator body, and the negative electrode being electrically connected to the other one of the switching portion and through the interior of the commutator.

5. The self-excited reluctance motor as claimed in claim 4, wherein the commutator body has an insulating portion formed on the outer circumference thereof and between the switching portions at an angle of 15°.

6. The self-excited reluctance motor as claimed in claim 1, wherein a number of the switching portions formed on the outer circumference of the commutator body corresponds to a number of places where the stator poles and the rotator poles are aligned with each other.

7. The self-excited reluctance motor as claimed in claim 6, wherein the switching brushes are spaced from each other at an angle that the stator is rotated from a point where a certain stator pole and rotator pole are aligned with each other to a point where the next stator pole and rotator pole are aligned with each other.

8. The self-excited reluctance motor as claimed in claim 7, wherein the switching portions are spaced from each other at an angle of 15°.

9. The self-excited reluctance motor as claimed in claim 6, wherein the switching portions are formed on the outer circumference of the commutator body at an angle of 90°.

* * * * *